Sept. 11, 1934.  E. J. W. RAGSDALE  1,973,268
AIRCRAFT STRUCTURE
Filed April 16, 1932
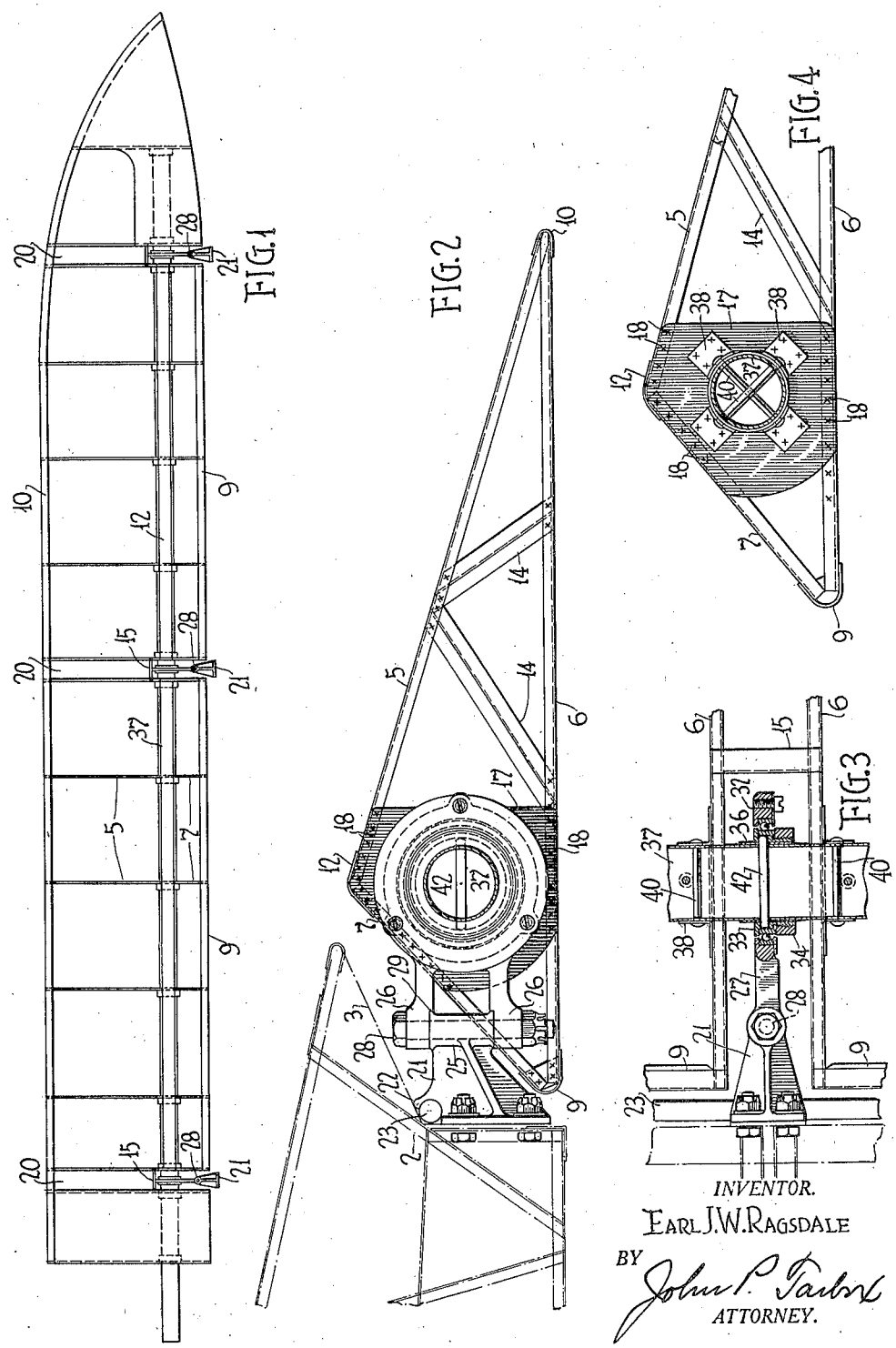
INVENTOR.
Earl J.W. Ragsdale
BY
John P. Taubel
ATTORNEY.

Patented Sept. 11, 1934

1,973,268

UNITED STATES PATENT OFFICE 1,973,268

AIRCRAFT STRUCTURE

Earl J. W. Ragsdale, Norristown, Pa., assignor to Edward G. Budd Manufacturing Company, Philadelphia, Pa., a corporation of Pennsylvania Application April 16, 1932, Serial No. 605,620

8 Claims. (Cl. 244—29)

My invention relates to aircraft structures and particularly to structures of this character that are constructed principally of metal.

One object of my invention is to provide a device of the above indicated character that shall be simple and durable in construction, economical to manufacture and effective in its operation.

Other objects of the invention are to facilitate the spot-welding of parts of a stainless sheet-steel structure, to render the structure strong, neat, compact and of light weight, to render the device free from small loose parts, to render more convenient the detachment of major component elements, such as relatively movable airfoils, to adequately mount a tube of thin gauge against torsion and to provide other advantages incidental to the utilization of the improvement.

In practicing my invention, I provide an element, corresponding to a hinge pin, that is constructed in the form of a thin gauge tube of relatively large diameter. This feature is to provide adequate bracing and spot-welding area between the tube and supporting gussets therefor, thereby providing a simple structure and eliminating many of the problems of mounting a tube or rod of small diameter. The feature also provides peripheral space about the tube to permit the use of a ball-bearing of sensible size.

Diametral keys of substantial shearing strength are disposed between the tube and its supporting gussets, and between the tube and a ball-bearing race.

This tube, constituting the major support for one of the relatively movable airfoils or other elements connected thereby, is mounted on brackets of such character as to permit the use of a single easily-removable pin at each hinge, whereby the separation or detachment of the elements is greatly facilitated and a strong brace is provided.

A fabric-holding element is so held by one of the brackets as to preclude the requirement for holding the element by separate means, thereby reducing the number and weight of the parts, and contributing to the overall efficiency of the aircraft in which the feature is employed.

A main gusset of large area plate form and other features are provided, as will hereinafter appear.

Fig. 1 of the accompanying drawing, is a plan view of an aileron embodying my invention, Fig. 2 is a view taken substantially along the line II—II of Fig. 1, together with a portion of a wing, shown in broken lines, Fig. 3 is a view, partially in bottom plan and partially in section, of the structure of Fig. 2, and Fig. 4 is a view of a portion of the structure as shown in Fig. 2, elements of Fig. 2 being removed for clearness.

The device comprises an airfoil element or wing including a frame 2 and a fabric cover 3 constituting no parts of my present invention, except insofar as they co-operate with parts of the invention, as herein specified.

Another airfoil element or aileron comprises trusses each including an upper chord 5, a lower chord 6 and a nose frame 7, all of channel section. These members are joined by leading-edge U-channels 9, a trailing-edge U-channel 10, U-channels 12, diagonal braces 14 of Z-section and cover supports 15.

Main gussets 17, preferably in the form of relatively thin sheet-metal plates, are disposed in the planes of the trusses and fitted to the sides of the triangular structure formed by the chords 5 and 6 and the channel member 7 to which they are spot welded, as at positions 18.

The aileron comprises several longitudinal sections, at spaces 20 between adjacent ends of which, brackets 21 for mounting on the wing 2 are provided. These brackets are so shaped, at portions 22, see Fig. 2, as to embrace a fabric holding member 23 and hold it against the wing frame 2. This holding is effected by the bolts or other means which hold the bracket itself, to thus render unnecessary separate clamping or holding means for the member 23.

The bracket 21 further comprises a tubular portion 25 disposed between and in alignment with similar tubular portions 26 on a co-operating bracket 27 for the reception of a pin 28. The portions 25 and 26 are provided with adjacent flat-plane interlocking surfaces, indicated at positions 29, in Fig. 2, to prevent relative turning thereof about the pin axis.

The structure, although appearing like a hinge, is thus constructed to provide widely separated supporting positions for the portions 26, to provide the portion 25 with a long bearing surface and to facilitate the mounting and dismounting of the aileron relative to the wing by requiring the removal of only one of the bolts 28 at each space 20.

The bracket 27 further comprises a ring-like portion 32 which co-operates with another ring 33 and a nut 34 to support a ball-bearing between the rings.

The ring 33 is mounted on a short thin-walled tube section 36 of large diameter and constituting a reinforcement of a similar tube 37 that extends from a position within the outer-end frame section of the aileron, longitudinally through the other sections and across the spaces 20.

The tube 37 extends through openings conforming thereto in the main gussets 17 to which it is secured by auxiliary gussets 38 having flat-plane portions spot welded to the gussets 17 and rounded portions fitting the tube 37.

Keys 40 extend through the tube 37 between radially-opposite elements or portions of the auxiliary gussets 38.

Similarly, keys 42 extend through the tubes 36 and 37 between radially-opposite portions of the rings 33. This structure provides light weight and relatively great torsional strength in proportion to the weight.

While I have shown and described a particular form of my invention, changes may be effected therein without departing from the spirit and scope thereof as set forth in the appended claims.

I claim as my invention:

1. An aircraft structure comprising relatively movable elements including an airfoil constructed in end-to-end related sections, adjacent ends of two of said sections including spaced substantially parallel trusses, plate gussets disposed one in each of said trusses in parallel-plane relation thereto, a thin-walled tube of large diameter extending transversely to, and between, said gussets, a hinge member on the tube between the trusses, and a co-operating hinge member extending thereto from the other element.

2. An aircraft structure comprising relatively movable elements including an airfoil frame, a hinge connecting the elements including co-operating brackets disposed one in each thereof, and a fabric-holding element for the frame element and held in position between the same and the bracket thereon.

3. An aircraft structure comprising an elongated airfoil adapted to turn about a longitudinal axis, said airfoil including several longitudinal frame sections adjacent ends between each pair of which embody spaced parallel transverse trusses, a large-diametered thin-walled tube constituting one element of a hinge extending from a position within the outer-end frame section longitudinally through the other sections and across the spaces therebetween, means supporting the tube on the trusses, and a plurality of co-operating hinge elements disposed in said spaces.

4. An aircraft structure comprising relatively fixed and movable aerofoil sections, a through running axis element housed within the body of one section, one piece bearing rings threaded on said through running axis element at intervals adapted to bear the through running element and permit the section to be moved about its axis with respect to the mating aerofoil section, and articulated knock-down connections between said bearing rings and the mating aerofoil section.

5. An aircraft structure comprising relatively fixed and movable aerofoil sections, a through running axis element housed within the body of one section, one piece bearing rings threaded on said through running axis element at intervals adapted to bear the through running element and permit the section to be moved about its axis with respect to the mating aerofoil section, and articulated knock-down connections between said bearing rings and the mating aerofoil section, which latter connections comprise brackets respectively rigidly connected to the bearing members and the mating aerofoil section and pin connected to each other in planes at right angles to the axis.

6. In an aircraft an aerofoil structure cut away at its trailing edge to coact with the trailing edge aileron and having longitudinal trusses comprising upper and lower chord elements and intervened web elements, the hindmost of said web elements interconnecting the chord elements at points inwardly removed from the end of each and means connecting the end of each with an immediate point on said endmost interconnecting element whereby to form an angular re-entrant longitudinal cross section of said rear portion.

7. In an aircraft an aerofoil section broken away at its trailing edge to coact with the trailing edge aileron and comprising longitudinally extending framework embodying chord members and an endmost inter-chord element interconnecting said chord elements at points removed from the ends of each, and means interconnecting the end of one of said chord elements with an intermediate portion of said inter-chord element and constituting an anchorage for aerofoil hinge elements.

8. In an aircraft an aerofoil structure broken away at its rear edge to coact with a trailing edge rudder and in longitudinal cross section embodying a trussed framework comprising upper and lower chord elements and an endmost inter-chord element connected with one of said chord elements at a point removed inwardly from its rearmost end, together with a trailing edge rudder having a leading edge overlapped by the chord elements rearwardly of said endmost inter-chord element.

EARL J. W. RAGSDALE.